(12) United States Patent
Johnson et al.

(10) Patent No.: US 8,506,160 B2
(45) Date of Patent: Aug. 13, 2013

(54) LIQUID BASED ICE PROTECTION TEST SYSTEMS AND METHODS

(75) Inventors: Vicki S. Johnson, Bel Aire, KS (US); Derek W. Rounds, Wichita, KS (US); Lawrence R. Nelson, Wichita, KS (US); Jeffrey G. Wyckoff, Wellington, KS (US); Robin L. Young, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 986 days.

(21) Appl. No.: 12/552,122

(22) Filed: Sep. 1, 2009

(65) Prior Publication Data

US 2010/0116042 A1    May 13, 2010

Related U.S. Application Data

(60) Provisional application No. 61/112,505, filed on Nov. 7, 2008.

(51) Int. Cl.
   *G01N 25/02*     (2006.01)

(52) U.S. Cl.
   USPC ....... 374/16; 374/109; 374/7; 374/3; 374/141

(58) Field of Classification Search
   USPC ............... 374/1, 3, 4, 5, 45, 141, 16, 33, 109, 374/7, 147, 110, 111, 112, 115, 137, 166, 374/167
   See application file for complete search history.

(56) References Cited

U.S. PATENT DOCUMENTS

| 4,801,113 | A | * | 1/1989 | Engelhardt | 244/121 |
|---|---|---|---|---|---|
| 5,134,248 | A |   | 7/1992 | Kiec et al. | |
| 5,167,451 | A | * | 12/1992 | Muller et al. | 374/45 |
| 5,282,682 | A | * | 2/1994 | Orlando et al. | 374/16 |
| 5,750,047 | A | * | 5/1998 | Lemma | 252/70 |
| 6,422,744 | B1 | * | 7/2002 | Galenkamp et al. | 374/57 |
| 6,644,849 | B1 | * | 11/2003 | Conner | 374/141 |
| RE39,295 | E | * | 9/2006 | Cronin et al. | 340/580 |
| 7,425,093 | B2 | * | 9/2008 | Wickersham et al. | 374/5 |
| 8,037,750 | B2 | * | 10/2011 | Heuer et al. | 73/170.26 |
| 2010/0078521 | A1 | * | 4/2010 | De Smet | 244/134 D |

FOREIGN PATENT DOCUMENTS

GB     2331972 A  *  6/1999

* cited by examiner

*Primary Examiner* — Gail Verbitsky
(74) *Attorney, Agent, or Firm* — Lathrop & Gage LLP

(57) ABSTRACT

A liquid based ice protection test method tests an aircraft part that includes at least a first heating element mounted on an inside surface of an aircraft skin. The method includes bringing the aircraft skin into contact with a low temperature bath and taking one or more temperature readings of the aircraft skin. A liquid based deicing test system includes a container that holds a low temperature bath, a fixture to suspend the aircraft part within the container, and a temperature sensing device for reading temperatures on an outside surface of the aircraft part. A liquid based ice protection test method includes sealing off ends of an aircraft part, attaching at least one temperature sensing device on the aircraft part and at least partially submerging it in a low temperature bath, and obtaining temperature information from the temperature sensing device.

11 Claims, 2 Drawing Sheets

LIQUID BASED ICE PROTECTION TEST SYSTEMS AND METHODS

CROSS-REFERENCE TO RELATED APPLICATIONS

This application claims the benefit of U.S. Provisional Patent Application No. 61/112,505 filed Nov. 7, 2008, the entire contents of which are herein incorporated by reference.

BACKGROUND OF THE INVENTION

1. Field of the Invention

The disclosed embodiments relate to thermal testing systems. More specifically, the embodiments disclosed relate to processes of simulating icing conditions for the purpose of testing aircraft ice protection equipment.

2. Description of the Related Art

The ice protection equipment employed on many aircraft includes a number of heating elements deposited on an inside surface of an aircraft skin at a leading edge of a particular component, e.g., wings, horizontal tails, and other parts that are susceptible to icing. Many systems include, at the very front of the leading edge, a "parting strip" heating element, and immediately behind the parting strip, what are referred to as "shed zone" heating elements. An upper shed zone element may be located on a top surface of the leading edge slightly back from the parting strip, and a lower shed zone element may be located below and slightly back of the parting strip. Before releasing such parts for use on an aircraft, it is critical for safety and other reasons that the heating elements are tested to ensure the equipment meets the desired performance requirements and that device failure is minimized.

One defect encountered in the manufacture of aircraft wings and other similar parts can exist in what is referred to as "matting" that may be used to secure heating elements to an inside surface of the skin at the leading edge. The matting is highly thermally conductive such that it promotes heat transmission from the heating element to the aircraft skin. Problems are encountered, however, when air bubbles exist in the matting between the heating element and the aircraft skin. As is noted in the art, air is highly resistant to heat transfer, and therefore air pockets in the matting can impair heat transmission from the heating element(s), and thus can promote unacceptable ice build up at the leading edge.

The manufacturer often tests the parts in what is referred to as an "icing tunnel"—a wind tunnel that simulates icing conditions as would exist in nature. An icing tunnel typically provides forced air that is highly saturated with supercooled water droplets at a full range of temperatures below freezing. Whether the ice is effectively eliminated can be, in some instances, visualized on the part during testing, or detected in other ways such as using sophisticated measurement equipment.

Icing tunnel testing will quickly show any deficiencies in heat transmission to the leading edge skin through a combination of visual observation and instrumentation. Defects in the heater installation can result in deficiencies in heat transmission to the leading edge skin with resulting unacceptable ice protection performance.

Using icing tunnels for testing purposes with defective parts, however, can be extremely expensive. Further, this expense is exacerbated considering that a single part may require three to four tests in the icing tunnel before it is successfully cleared.

SUMMARY

Disclosed is a liquid based ice protection test method for testing a part. In some instances, the part is a leading edge of an aircraft component. For some embodiments, the article to be tested includes a first heating element mounted on an inside portion of an aircraft skin at a first location, and the method comprises: bringing the aircraft skin into contact with a low temperature bath with a heat removal mechanism; and taking one or more temperature readings from the aircraft skin. A resistance temperature detector can be used as a temperature sensing device for taking the temperature readings. The bath may be included in a tub; and the part may be suspended into the tub such that the leading edge is submerged in the bath. In certain embodiments, ice and water are used to create the bath; in these embodiments, ice is the heat removal mechanism. Also, in certain embodiments, the bath is agitated; in these embodiments agitation provides another heat removal mechanism.

In terms of the article being tested, the method can include providing a second heating element on the inside portion of the skin at a second location; mounting a second temperature sensing device on an outside surface of the skin opposite the second location; and taking readings from the second temperature sensing device while readings are taken from the first temperature sensing device. In embodiments, the user can detect defects using the readings.

In embodiments, the first heating element is included in a matting material and air gaps in the matting are detected between the heating element and the inside portion of the skin using the readings. In embodiments, a parting strip is, and/or a shed zone heating element may be selected as a heating element to be tested.

In embodiments, the readings are used to determine the presence of defects in the part as a prerequisite to testing the part in an icing tunnel for compliance purposes.

A liquid based ice protection test system for testing a part is also disclosed. In embodiments, the part is an aircraft part that has a heating element on an inside portion of an aircraft skin. In embodiments, the system comprises: (i) a container configured for holding a low temperature bath; (ii) means to suspend the part within the container; and (iii) a temperature sensing device for reading temperatures from one or more locations on an outside surface of the aircraft skin. The temperature sensing device is a resistance temperature detector in some embodiments of this system.

In some embodiments a liquid based ice protection test method for testing a part including an aircraft skin includes: sealing off first and second ends of the part; attaching at least one temperature sensing device on an outside surface of the aircraft skin; at least partially submerging the part in an low temperature bath such that an inside portion of the aircraft skin remains sealed off while at least a portion of the skin, and the temperature sensing device, are exposed to the low temperature bath; and taking readings from the temperature sensing device. In certain embodiments, the heating element may be activated.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The embodiments disclosed herein provide systems and a method for testing ice protection systems that use heating devices, e.g., heating elements. For example, in one embodiment liquid based ice protection test system is disclosed which simulates maximum heat transfer close to −30° C. in an icing tunnel. Depending on the aircraft operational envelope, the icing tunnel may be used to simulate the most stringent requirements for certification. The process can be used to detect, for example, defective heating elements and/or bonding defects between the heating elements and an aircraft skin.

Figure 1:
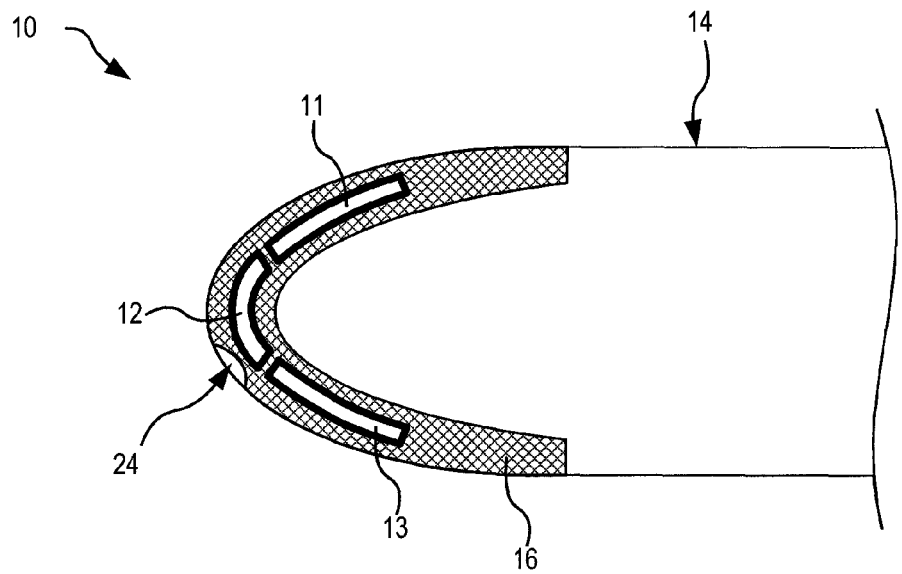
FIG. 1 is a cross-sectional view of a wing leading edge and structures therein.

Certain embodiments herein relate to testing wing and other similar parts leading edge ice protection structures. A typical leading edge ice protection arrangement can be seen in the aircraft part shown being tested in FIGS. 1 and 2. Referring to FIG. 1, which is a cross sectional view of a leading edge section 10, it can be seen that leading edge section 10 includes an upper shed zone heating element 11, a parting strip 12, and a lower shed zone heating element 13. Heating elements 11, 12 and 13 are disposed within a skin 14 of leading edge 10, and may be electrically powered in flight to heat up leading edge 10 to prevent ice from building up on the wing, to cause ice to shed, or both. Each of heating elements 11, 12 and 13 is bonded with skin 14 using matting 16. As is known to those skilled in the art, matting 16 provides dielectric insulation between each of heating elements 11, 12 and 13 and skin 14. One material that can be used to form matting 16 is silicone; however it is appreciated that other dielectric insulative materials could be used instead.

Embodiments herein are useful for, e.g., detecting defects in bonding of heating elements to an aircraft skin. One problem in manufacturing and/or product development of leading edge ice protection systems is that manufacturing defects can occur in matting 16, or in bonding matting 16 with heating elements 11, 12 and 13 and with skin 14. Such defects may especially occur between parting strip 12 and a most curved surface of leading edge section 10. One common defect is the development of air gaps, e.g., air gap 24 shown in FIG. 1. Air gap 24 interferes with heat transfer capabilities of heating element 12 (because it locally insulates skin 14 from heating element 12), which may lead to a hazardous inability to protect leading edge section 10 from unacceptable ice buildup, if not detected before section 10 is put in service.

Historically, various test techniques such as infrared imaging, cold environmental chambers, resistance measurements, and so forth have been used to test for defects in the heating systems, (e.g., defects in matting, air gaps, and the like). Air gaps and other bonding defects may occur at locations that are not readily visible to a manufacturer. The final and decisive test is conventional thermal testing performed in an icing tunnel to simulate the worst case scenario a wing would encounter in service. The part must be subjected to these worst-case-scenario conditions (e.g., −30° C. at sustained exposure) in order to obtain the necessary certifications.

Utilizing an icing tunnel, however, is extremely expensive and time consuming. For example, a single test can cost in excess of $50,000 and take a week to complete. Significant logistical dilemmas must also be overcome to arrange such a test. Further, it is often necessary to make multiple trips to the icing tunnel as defects are encountered. This is because there, as to now, has been no cost-effective way to simulate the heat transfer conditions experienced in the icing tunnel. So a tester may unknowingly bring a defective part to the tunnel, wasting valuable resources and time.

Figure 2:
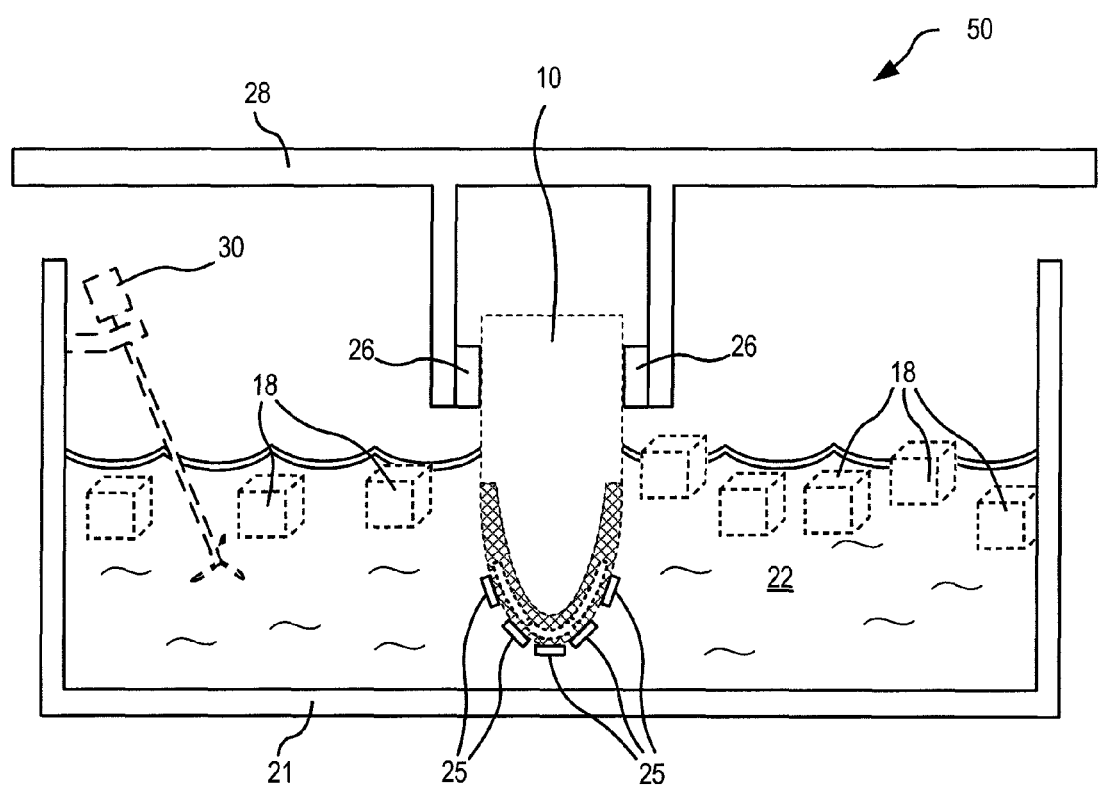
FIG. 2 is a cross-sectional view of the wing leading edge of FIG. 1 being tested in one embodiment of a liquid based ice protection test system.

The systems and methods disclosed herein allow for rapid and inexpensive screening of test articles that may otherwise have required repeated icing tunnel testing. An embodiment of an liquid based ice protection test system used in executing these methods is illustrated in FIGS. 1 and 2. The part being tested in these figures is a leading edge section 10. It is important to recognize, however, that numerous other applications for this testing system and associated methods exist. For example, the process could be used to simulate other ice protection conditions. These tests could also be used to test other parts which include heating elements that are secured inside aircraft surfaces (e.g., skins) for ice protection purposes. These tests could also be used to test temperature distributions of aircraft parts that are heated by alternate means such as, for example, bleed air.

Figure 3:
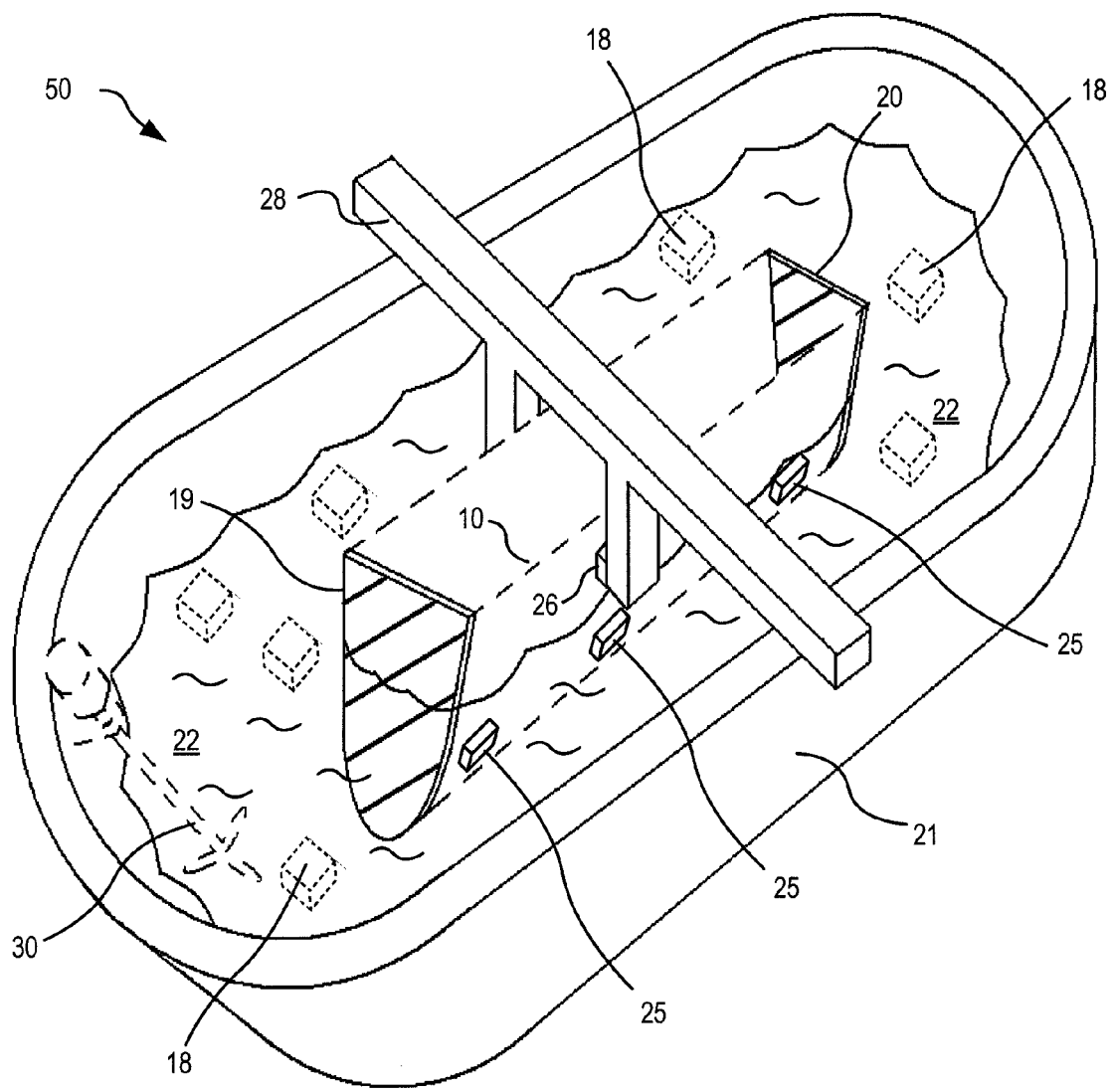
FIG. 3 is a perspective view of the liquid based ice protection test system of FIG. 2.

A liquid based ice protection test system 50 in assembled form is shown in FIGS. 2 and 3. Leading edge section 10 shown in FIGS. 2 and 3 is suspended into a low temperature bath that may include, for example, a liquid 22 and ice 18, in a tub 21. An agitation system 30 is be desirable for stirring the low temperature bath. Agitation system 30 is shown as a motorized shaft and paddle, but could be arranged in some other form such as a forced circulation system or a magnetic stirring system. Agitation system 30 ensures thorough mixing such that the part being tested is continuously presented with a uniformly cold solution during the test period, so that steady data is taken in the low temperature bath, even if the part being tested dissipates heat (e.g., from heating elements 11, 12 and/or 13). Ice 18 in the liquid 22 also absorbs dissipated heat (e.g., from heating elements 11, 12, and/or 13) such that the part being tested is continuously presented with a uniformly cold solution during the test period, so that steady data is taken in the low temperature bath.

As can be seen in FIG. 3, a forward end panel 19 and a rear end panel 20 seal respective ends of skin 14 of leading edge section 10. End panels 19 and 20 keep liquid out of the interior regions of leading edge section 10, and thus protect internal electrical features thereof.

System 50 also includes a suspension subsystem that supports a part being tested. For example, in FIG. 2 and FIG. 3, leading edge section 10 is suspended into the bath using opposing lateral supports 26 that are supported by a cross member 28. Cross member 28 extends across the low temperature bath and may rest at each end on an upper rim surface of tub 21, as shown in FIG. 2. Although only one member 28 is shown in the embodiment shown in FIG. 2, additional cross members may be provided for leading edge section 10 (or other part being tested) for improved mechanical stability. Also, although two lateral supports 26 are shown, it is understood that a part being tested may be supported by only one, or more than two, supports.

As shown in FIG. 2 and FIG. 3, lateral supports 26 are secured to cross member 28, for example by welding, fasteners, or other known securing techniques. Cross member 28, in embodiments, may simply rest on a rim of tub 21 during testing of the part, but could alternatively be removably secured with an upper part of tub 21 using fasteners of some other means, or could be suspended over tub 21 with a hoist. Lateral supports 26 are attached to the outside of part 10, e.g., using fasteners, clamps, or some other known attachment means.

In operation, the part to be tested (e.g., leading edge section 10), lateral supports 26, and cross member 28 may be prepared for testing outside of the low temperature bath. This may include attaching appropriate temperature sensing devices or other testing equipment. For example, Resistance Temperature Detectors ("RTDs"), which are temperature sensing devices that exploit a predictable change in electrical resistance due to temperature change, may be used. The temperature sensing devices may be affixed to a part being tested prior to immersion. For example, FIG. 2 and FIG. 3 show temperature sensing devices 25 affixed to skin 14 of leading edge section 10 at intervals over skin 14 corresponding to each of heating elements 11, 12 and 13; locations between heating elements would also be suitable places to locate sensing devices 25. This enables temperature readings to be taken at a variety of locations on the leading edge that will help determine whether defects (e.g., the air gaps at location 24) exist or not. Although RTDs are discussed herein, it is contemplated that other devices or methods may be utilized to measure temperature of a part being tested. It should be evident that spatial detail of temperature measurements across the part may be increased in correspondence with a number of temperature sensing devices deployed on the part, and that apparatus and/or methods of measuring temperature at a distance may be employed. Additionally, the heating elements 11, 12 and 13 may be electrically connected to one or more respective driver circuits so that they can be activated for the test.

The liquid bath must also be prepared before the test. This may involve, for example, placing ice 18 and liquid 22 in tub 21. In an embodiment, ice 18 is first added to tub 21 until the tub is partially full, then liquid 22 is added to raise the ice/liquid mixture to a desired level. If extensive testing is conducted, liquid 22 may need to be removed and more ice 18 added. Motorized agitating system 30 may be activated to circulate the liquid so that a part being tested will continue to be presented with uniformly cold liquid while heat dissipates from one or more surfaces of the part. Although an ice and water bath is described in particular detail herein, it is contemplated that other liquids and/or solids may be utilized in certain embodiments.

After the low temperature bath is prepared, a part to be tested (e.g., leading edge section 10) is inserted into the tub 21 in "boat" fashion, as shown in FIGS. 1 and 2, such that it is suspended below cross member 28 which may for example rest at each end on rim portions on opposite sides of tub 21. Once so positioned, the part is ready for testing.

To execute the test, heating elements may be activated individually or simultaneously, and readings may be taken from temperature sensing devices 25 located outside the leading edge skin 14.

After the testing is complete, the section 10 is simply lifted out of the tub, and set aside. Liquid 22 and/or ice 18 may be simply poured out or may be reused in an additional test.

Use of the liquid based ice protection test system and methods herein may prevent taking underperforming parts (e.g., having certain defects such as air gaps) to an icing tunnel unnecessarily. Icing tunnel testing may still be utilized to obtain certifications, but unnecessary trips to the tunnel with underperforming parts may be avoided.

Many different arrangements of the various components depicted, as well as components not shown, are possible without departing from the spirit and scope of the present invention. Embodiments of the present invention have been described with the intent to be illustrative rather than restrictive. Alternative or equivalent embodiments will become apparent to those skilled in the art that do not depart from its scope. A skilled artisan may develop alternative or equivalent means of implementing the aforementioned improvements without departing from the scope of the present invention.

It will be understood that certain features and subcombinations are of utility and may be employed without reference to other features and subcombinations and are contemplated within the scope of the claims. Not all steps need be carried out in the specific order described.

The invention claimed is:

1. A liquid based ice protection test method for testing a part, said part including a first heating element mounted on an inside surface of an aircraft skin at a first location, said method comprising:
    bringing said aircraft skin into contact with a low temperature bath; and
    taking one or more temperature readings of said aircraft skin, wherein said bath is provided in a tub; and
    bringing said aircraft skin into contact with said bath comprises suspending said part into said tub such that at least a portion of said aircraft skin is submerged in said bath.

2. The method of claim 1, wherein providing said bath comprises providing ice and water as said bath.

3. The method of claim 1, further comprising agitating said bath.

4. The method of claim 1 comprising:
    selecting a parting strip as said first heating element.

5. The method of claim 1, further comprising
    mounting a temperature sensing device on an outside surface of said skin opposite said first location, and wherein taking one or more temperature readings comprises utilizing the temperature sensing device.

6. The method of claim 5 wherein mounting the temperature sensing device comprises mounting a resistance temperature detector.

7. The method of claim 5, further comprising
    providing a second heating element on said inside surface of said skin at a second location;
    mounting a second temperature sensing device on said outside surface of said skin opposite said second location; and
    taking temperature readings from said second temperature sensing device.

8. The method of claim 1 further comprising
    utilizing said readings to detect one or more defects in the part.

9. The method of claim 8 wherein utilizing said readings to detect one or more defects comprises detecting one or more air gaps between said heating element and said aircraft skin using said readings.

10. The method of claim 1 comprising:
    selecting a shed zone heating element as said first heating element.

11. The method of claim 1 comprising:
    using said readings to predict the absence of defects in order to qualify said part for testing in an icing tunnel.

* * * * *